US009955432B2

United States Patent
Ponnuswamy et al.

(10) Patent No.: US 9,955,432 B2
(45) Date of Patent: Apr. 24, 2018

(54) METHOD AND SYSTEM FOR ADAPTIVE CELL SIZE MANAGEMENT

(71) Applicant: Aruba Networks, Inc., Sunnyvale, CA (US)

(72) Inventors: Subburajan Ponnuswamy, Saratoga, CA (US); Neal Castagnoli, Morgan Hill, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/445,316

(22) Filed: Jul. 29, 2014

(65) Prior Publication Data

US 2016/0037458 A1 Feb. 4, 2016

(51) Int. Cl.
*H04W 52/24* (2009.01)
*H04B 17/318* (2015.01)
*H04W 84/12* (2009.01)

(52) U.S. Cl.
CPC ........ *H04W 52/241* (2013.01); *H04B 17/318* (2015.01); *H04W 52/24* (2013.01); *H04W 52/242* (2013.01); *H04W 52/245* (2013.01); *H04W 84/12* (2013.01)

(58) Field of Classification Search
CPC ............. H04W 52/367; H04W 52/241; H04W 52/242; H04W 52/24
See application file for complete search history.

(56) References Cited

U.S. PATENT DOCUMENTS

| | | | |
|---|---|---|---|
| 2008/0075035 A1* | 3/2008 | Eichenberger | H04W 36/08 370/328 |
| 2011/0153805 A1* | 6/2011 | Beninghaus | H04B 17/382 709/224 |
| 2013/0051270 A1* | 2/2013 | Ren | H04B 1/1027 370/252 |
| 2014/0036808 A1* | 2/2014 | Pelletier | H04W 72/14 370/329 |
| 2015/0063223 A1* | 3/2015 | Shen | H04W 52/265 370/329 |
| 2015/0242665 A1* | 8/2015 | Antonescu | G06K 19/0724 340/8.1 |
| 2015/0373639 A1* | 12/2015 | Zhou | H04W 52/02 370/311 |
| 2016/0174165 A1* | 6/2016 | Ikenaga | H04W 52/283 455/522 |

* cited by examiner

*Primary Examiner* — Romani Ohri
(74) *Attorney, Agent, or Firm* — Hewlett Packard Enterprise Patent Department

(57) ABSTRACT

The present disclosure discloses a method and system for adaptive cell size management. The system can determine a minimum SNR value and one or more current environmental factors for a particular environment. Also, the system dynamically determines a minimum signal strength value for receiving wireless signals based on the minimum SNR value and the one or more current environmental factors, and configures a network device to receive signals with the minimum signal strength value. Alternatively, the system can estimate a particular coverage area such that a first set of wireless signals transmitted by devices located within the particular coverage area reach a network device at a minimum signal strength. The system then computes a transmission power such that a second set of wireless signals transmitted by the network device at the transmission power reaches an edge of the particular coverage area at a particular signal strength value.

20 Claims, 8 Drawing Sheets

| NUMBER OF STREAMS 300 | 20MHz RATE (Mbps) 310 | 40MHz RATE (Mbps) 320 | 40MHz SGI RATE (Mbps) 330 | MIN REQUIRED SNR (dB) 340 |
|---|---|---|---|---|
| 1 | 6.5 | 13.5 | 15 | 5 |
| | 13 | 27 | 30 | 7 |
| | 19.5 | 40.5 | 45 | 9 |
| | 26 | 54 | 60 | 12 |
| | 39 | 81 | 90 | 16 |
| | 52 | 108 | 120 | 20 |
| | 58.5 | 121.5 | 135 | 21 |
| | 65 | 135 | 150 | 23 |
| 2 | 13 | 27 | 30 | 10 |
| | 26 | 54 | 60 | 13 |
| | 39 | 81 | 90 | 15 |
| | 52 | 108 | 120 | 16 |
| | 78 | 162 | 180 | 21 |
| | 104 | 216 | 240 | 26 |
| | 117 | 243 | 270 | 27 |
| | 130 | 270 | 300 | 29 |

FIG. 3A

| RATE (Mbps) 350 | 1 | 2 | 5.5 | 11 | 6 | 9 | 12 | 18 | 24 | 36 | 48 | 54 |
|---|---|---|---|---|---|---|---|---|---|---|---|---|
| MIN REQUIRED SNR (dB) 360 | 4 | 6 | 8 | 10 | 4 | 5 | 7 | 9 | 12 | 16 | 20 | 21 |

FIG. 3B

ESTIMATE A PARTICULAR COVERAGE AREA SUCH THAT A FIRST SET OF WIRELESS SIGNALS TRANSMITTED BY DEVICES LOCATED WITHIN THE PARTICULAR COVERAGE AREA REACH A NETWORK DEVICE AT A MINIMUM SIGNAL STRENGTH
500

COMPUTE A TRANSMISSION POWER TO BE USED BY THE NETWORK DEVICE TO TRANSMIT A SECOND SET OF WIRELESS SIGNALS SUCH THAT THE SECOND SET OF WIRELESS SIGNALS REACH AN EDGE OF THE PARTICULAR COVERAGE AREA AT A PARTICULAR SIGNAL STRENGTH VALUE
520

CONFIGURE THE NETWORK DEVICE TO USE THE TRANSMISSION POWER TO TRANSMIT THE SECOND SET OF SIGNALS
540

FIG. 5

METHOD AND SYSTEM FOR ADAPTIVE CELL SIZE MANAGEMENT

FIELD

Embodiments of the present disclosure relate to radio management in wireless local area networks (WLANs). In particular, embodiments of the present disclosure describe a method and network device for adaptive coverage area management in wireless local area networks.

BACKGROUND

IEEE 802.11 standards are designed as network protocols that allow for sharing of medium. However, an entity may deploy network devices, such as access points (APs), in high density to support higher capacity. On the other hand, the receive sensitivity (i.e., the ability of the radios to receive signals from farther away sources) and transmit capabilities of radios have increased with the advancement of technologies. Hence, in a typical wireless deployment, an AP can receive signals from sources located far away from the AP, which may result in the AP spending time receiving unnecessary signals which could otherwise be used to communicate with its clients.

Moreover, as per the Carrier Sense Multiple Access (CSMA) protocol, when an AP receives a decodable IEEE 802.11 standard compliant wireless signal, albeit from a faraway source, the AP will refrain from transmitting any signals until the reception is complete. However, because the received signal is transmitted by a faraway source, the AP may not need to receive that signal and instead could use that time to communicate with a device closer to the AP.

Also, when a client device connects to an AP in a wireless local area network (WLAN), the client device may have a preference to stay connected with the same AP. Therefore, when such client device moves from one physical location nearby to a different physical location faraway, the AP will have to transmit signals at a lower data rate to the client device moving to the faraway physical location. The lowered data rate will negatively impact network performance for other client devices in the WLAN by consuming the radio frequency (RF) medium with very long transmissions.

DETAILED DESCRIPTION

In the following description, several specific details are presented to provide a thorough understanding. While the context of the disclosure is directed to coverage area management in wireless local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIGS. 3A-3B illustrate exemplary minimum Signal-to-Noise Ratio (SNR) requirements used by a parameter control scheme according to embodiments of the present disclosure.

FIG. 5 illustrates an exemplary process for adaptive coverage area management according to embodiments of the present disclosure.

OVERVIEW

Figure 1:
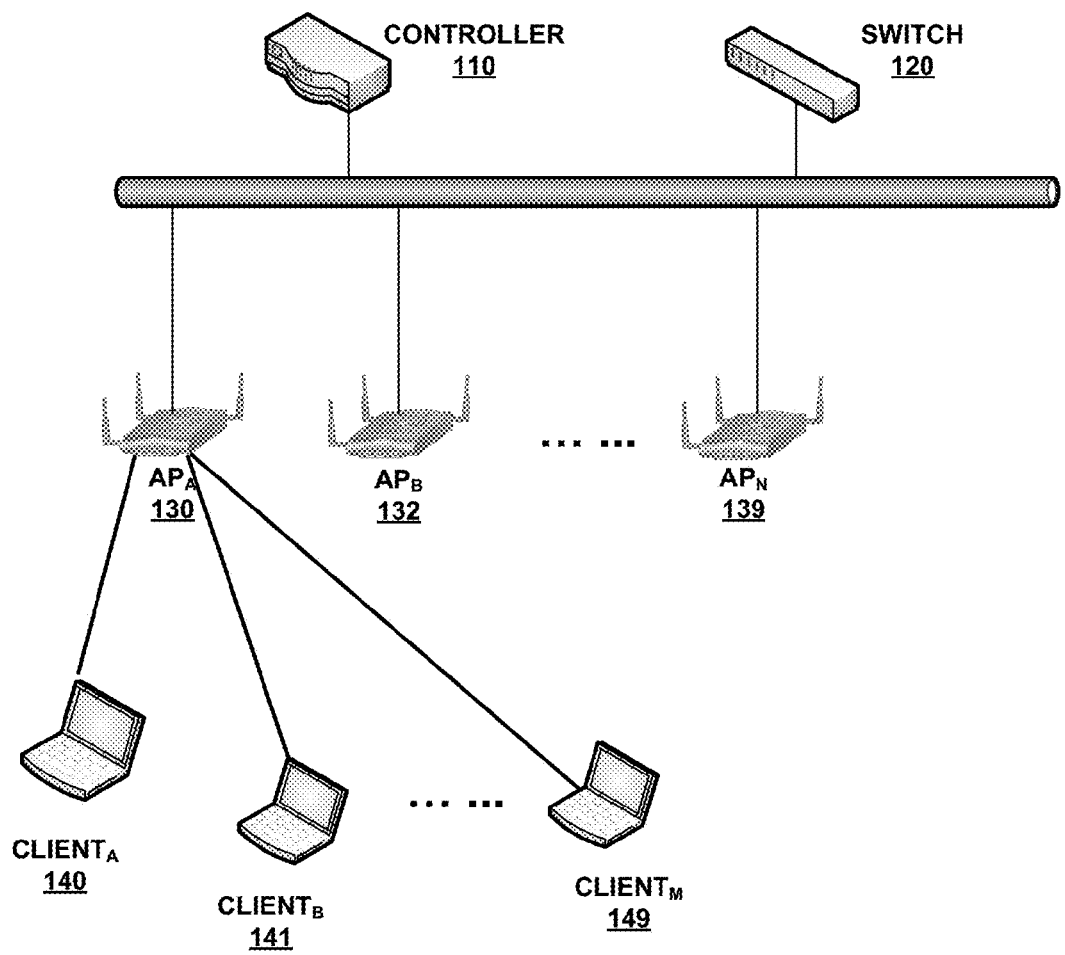
FIG. 1 shows an exemplary block diagram illustrating an exemplary network according to embodiments of the present disclosure.

Embodiments of the present disclosure relate to radio management in wireless local area networks (WLANs). In particular, embodiments of the present disclosure describe a method and network device for adaptive coverage area management in wireless local area networks. Note that, the terms "cell," "coverage area," and "communication range" are used interchangeably throughout the present disclosure, and can be determined by any one or more of the factors such as signal strength, a signal-to-noise ratio, beacon modulation and coding set (MCS) rate, physical distance, etc.

There are a number of ways to control the transmit (Tx) and receive (Rx) coverage areas of a radio. First, an adaptive radio management system can control the transmission power of a radio of an AP such that the AP's communication range is limited. Nevertheless, the AP may still receive interfering signals from outside the communication range. Second, the adaptive radio management system can control transmit coverage area by modifying the beacon modulation and coding set (MCS) rate. Each MCS requires a minimum signal-to-noise ratio (SNR) for reliable reception. By increasing or decreasing the MCS encoding rates, the adaptive radio management system can control the area within which a client can receive beacons. Third, the system may set a de-sensing parameter (e.g., Cell-Size Reduction, also referred to as CSR) to control the receiving sensitivity for wireless frames. When the de-sensing parameter is configured to a threshold value, the radio will not receive or process any frames whose signal strength or SNR is below the threshold. Fourth, the system may configure a probe request threshold, such that the radio will not respond to probe requests from clients if the signal strength or SNR associated with the probe request is below the configured probe request threshold. Fifth, the system can transmit a de-authentication frame to an associated client, if the signal strength or SNR associated with a wireless frame from the client device falls below a certain threshold value. Nevertheless, the above parameters are typically independently adjusted rather than adjusted in a coordinated manner.

With the solution provided herein, the disclosed network device determines a minimum signal-to-noise ratio (SNR) value or signal strength. Note that, the term "SNR" and "signal strength" are used interchangeably throughout the present disclosure unless otherwise explicitly stated. Particularly, SNR can be derived from signal strength and vice versa, if the exact or estimated noise floor is known. The disclosed network device also determines one or more current environmental factors for a particular environment. The disclosed network device then dynamically determines a minimum signal strength value for receiving wireless signals based on the minimum signal-to-noise ratio (SNR) value and the one or more current environmental factors, and configures a network device to receive signals with the minimum signal strength value.

According to some embodiments of the present disclosure, the disclosed network device estimates a particular coverage area such that a first set of wireless signals transmitted by devices located within the particular coverage area reach a network device at a minimum signal strength. The disclosed network device then computes a transmission power to be used by the network device to transmit a second set of wireless signals such that the second set of wireless signals reach an edge of the particular coverage area at a particular signal strength value, and configures the network device to use the transmission power to transmit the second set of signals.

In some embodiments, the disclosed network device estimates a particular coverage area such that a first set of wireless signals transmitted by devices located near an edge of the particular coverage area reach a network device at a first signal strength value. The disclosed network device then computes a transmission power to be used by the network device to transmit a second set of wireless signals such that the second set of wireless signals reach the edge of the particular coverage area at a second signal strength value greater than the first signal strength value. Moreover, the disclosed network device configures the network device to use the transmission power to transmit the second set of wireless signals.

Network Environment

FIG. 1 shows an exemplary block diagram illustrating an exemplary network environment according to embodiments of the present disclosure. Specifically, FIG. 1 illustrates a network that includes at least a switch 120, a network controller 110, and a plurality of network devices, such as $AP_A$ 130, $AP_B$ 132, . . . , $AP_N$ 139. Furthermore, multiple client devices are associated with each access point. For example, $Client_A$ 140, $Client_B$ 141, . . . $Client_M$ 149 are associated with $AP_A$ 130.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Switch 120 generally refers to a computer networking device that is used to connect devices together on a computer network by performing a form of packet switching. A switch can send a message only to the port connected to the device that needs or requests the message. A switch is a multi-port network bridge that processes and forwards data at the data link layer (layer-2) of the OSI (Open Systems Interconnection) model. A switch may also have additional features, including the ability to route packets, e.g., as layer-3 or multilayer switches.

Access points, such as $AP_A$ 110, $AP_B$ 112, . . . , $AP_N$ 119, generally refer to a wireless network device that allows wireless client devices to connect to a wired network using IEEE 802.11 or related standards. The APs usually connect to a router via a wired network, but can also be an integral component of the router itself.

Moreover, each access point serves one or more client devices. During operations, a mobile client device, such as $Client_M$ 149, may change its physical location. When the mobile client device moves outside a cell size associated with the AP, the client device will likely disassociate from one access point and associate with another access point.

Each access point and/or client device has one or more radios. A coverage area is dynamically selected for each radio. In general, a transmit coverage area (i.e., TX-Cell-Size) typically refers to an area surrounding a transmitting device within which a receiver can reliably receive and decoded transmitted signals by the transmitting device. Thus, the transmit coverage area defines boundaries beyond which the transmissions are not required to be decodable. It should be noted that the interference range of wireless transmissions, such as WiFi, is much higher than the communication range. In other words, a radio of an access point can be highly sensitive and hear interfering signals that originated outside its transmit coverage area (i.e., TX-Cell-Size). On the other hand, a receiving range (i.e., Rx-Cell Size) can refer to an area within which a radio of an AP can receive a signal transmitted by a client device at a minimum signal strength. The receiving range typically defines boundaries where only transmissions within these boundaries are required to be received. In both cases, the transmitting device may be either a wireless network device (such as an access point) or a wireless client device.

Control Parameters

Figure 2A:
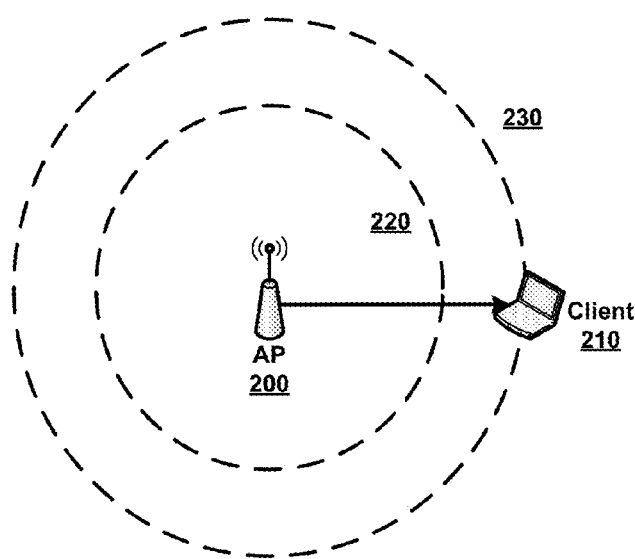
FIGS. 2A-2B illustrate an exemplary parameter control scheme according to embodiments of the present disclosure.
Figure 2B:
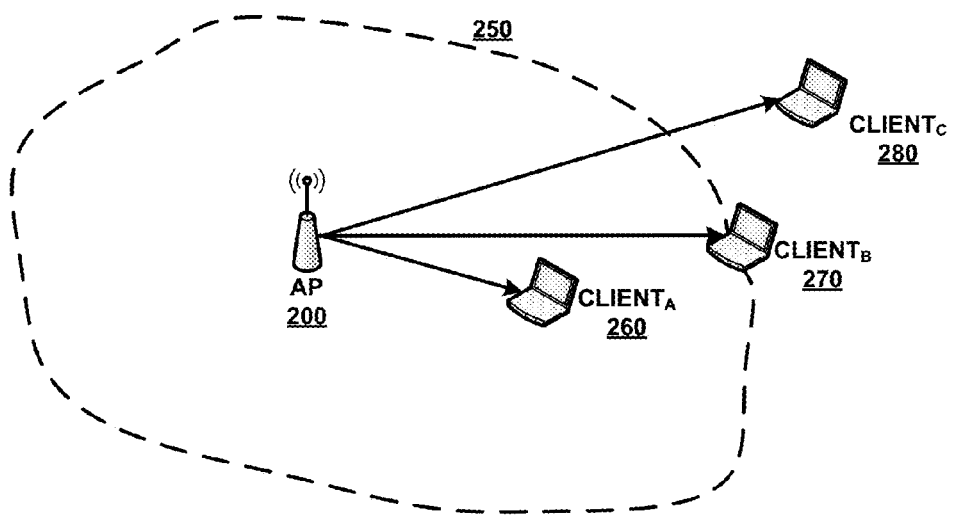

FIGS. 2A-2B illustrate an exemplary parameter control scheme according to embodiments of the present disclosure. Specifically, FIG. 2A includes an access point 200 and a client device 210. The circular area 220 represents a receive communication range, whereas the circular area 230 represents a transmit coverage area. Note that, in most cases, the receive communication range is the same as the transmit coverage area. However, in some cases, it may be desirable for the receive communication range and transmit coverage area to be asymmetric. For example, in a shopping mall with dense client devices and/or dense AP deployment by multiple wireless networks, the receive communication range may be set to a small value, whereas the transmit coverage area may be set as a relatively large value.

In addition, the boundary of the areas can be defined with any shape in two-dimensional and/or three-dimensional spaces. Specifically, FIG. 3B includes an AP 200 with a coverage area defined by boundary 250. Note that, the shape of cell boundary 250 may be affected by factors, such as, physical barriers and/or medium located within the coverage area, etc. FIG. 3B also includes three client devices. The first client device $Client_A$ 260 is located within boundary 250. Thus, AP 200 will transmit its signals at a transmission power that guarantees that $Client_A$ 260 will receive the signal from anywhere within boundary 250. The second client device $Client_B$ 270 is located at boundary 250. Note that, when $Client_B$ 270 moves along cell boundary 250, AP 200 will receive signals from $Client_B$ 270 at the same minimum signal strength value, e.g., −65 dB. The third client device $Client_C$ 280 is located outside boundary 250. Therefore, Client$_c$ 280 is within the de-authentication zone. As a result, AP 200 can send a DE-RUTH message to Client$_c$ 280 to de-authenticate the client device Client$_c$ 280 after detecting that Client$_c$ 280 has moved outside boundary 250.

The following parameters can be used to control the parameters of a radio of a network device (e.g., an access point).

A. De-Sensing Mechanism

A de-sensing parameter, e.g., the cell-size reduction (CSR) parameter, controls receiving sensitivity for wireless frames. When the de-sensing parameter is configured to a particular value, e.g., a signal-to-noise ratio (SNR) value or a received signal strength indicator (RSSI) value, the radio will not receive any frames with an SNR value and/or a RSSI value below the particular value. Thus, the de-sensing parameter essentially controls the receiving communication range by restricting reception of frames above the particular threshold value.

It is important to note that the de-sensing parameter ensures that the clear channel assessment (CCA) mechanism of the radio is not asserted for frames with any RSSI and/or SNR value below the specified threshold value. Clear Channel Assessment (CCA) generally refers to one of two carrier sense mechanisms in WLAN as defined in the IEEE 802.11-2007 standards, including Carrier Sense (CCA-CS) functionality and Energy Detect (CCA-ED) functionality. Carrier Sense (CCA-CS) generally refers to the ability of the receiver to detect and decode a Wi-Fi preamble. Energy Detect (CCA-ED) generally refers to the ability of the receiver to detect non-Wi-Fi energy in the operating channel and back off data transmission. For example, the ED threshold can be defined as 20 dB above the minimum receive (Rx) sensitivity of the physical layer (PHY). If the in-band signal energy exceeds the ED threshold, CCA is held busy until the medium energy is below the threshold. The de-sensing parameter threshold allows a radio to ignore transmissions originating outside the desired coverage area for the radio.

B. De-Authentication Frame

A de-authentication frame can be sent to an associated client, if the received signal strength indicator (RSSI) and/or signal-to-noise ratio (SNR) value of a signal received from the associated client falls below a particular threshold value. The RSSI and/or SNR value can be measured from any frame transmitted by the associated client or an acknowledgment frame (ACK) transmitted in response to a frame received by the client from the AP.

The de-authentication frame can limit the range of the transmit (Tx) coverage area in an asynchronous environment. Note that, in the asynchronous environment, the transmit (Tx) coverage area may be different from the receive (Rx) communication range. Thus, the client device may be able to receive frames from the AP, but is not aware that the AP may not receive frames from the client device because the client device has roamed to an area outside the client device's maximum transmit communication range can reach the AP.

C. IEEE 802.11 Standard Methods

IEEE 802.11 standards, including but not limited to, IEEE 802.11k standard and IEEE 802.11v standard, define various methods for client roaming support. For example, the basic service set (BSS) transition management frame can be used by an AP to suggest other APs in the WLAN for a client device to roam to. The IEEE 802.11k standard protocol provides mechanisms for APs and client devices to dynamically measure the available radio resources. With an IEEE802.11k-enabled network, APs and client devices can send neighbor reports, beacon reports, and link measurement reports to each other, thereby allowing the APs and client devices to take appropriate connection actions. Furthermore, wireless standards may define other methods to request or instruct the client device to move. These methods can be modified such that the AP triggers the client device to roam to another AP when the SNR and/or RSSI value associated with a signal received from the client device falls below a particular threshold value.

D. Beacon Transmit Rate or Modulation and Coding Set (MCS)

One technique to reduce the transmit (Tx) coverage range is to modify the beacon transmit rate or modulation and coding set (MCS) rate. Each MCS requires a minimum signal strength (e.g., SNR) value for reliable reception, thereby allowing software to control an aspect of the transmit (Tx) coverage area. Receiving beacons are important to client devices for establishing and maintaining connections. By increasing or decreasing the encoding rates, the area in which clients can receive beacons may be controlled by the adaptive radio management software.

E. Beacon Power Control

When the transmit power of the entire radio is changed, it can have undesirable effects. Though it is desirable to reduce the SNR of client devices outside the desired coverage range, it is not possible to reduce the SNR outside the desired coverage range without also reducing the SNR inside such desired coverage range. Reduction of SNR inside the coverage area will decrease the chances that the frame is received at a specific MCS inside the transmit (Tx) coverage area. Therefore, it is not desirable to reduce the transmit power of the entire radio beyond a minimum value. Instead, only the transmit power of the beacons is used to control the transmit coverage area size. Moreover, transmit power can be managed on a per-client or per-frame basis.

F. Probe Request Threshold

When a probe request threshold parameter is configured, the radio will not respond to a probe request message from client devices if the SNR and/or RSSI value of the probe request message is below the specified probe request threshold value. Therefore, probe request threshold can be used to prevent client devices outside the desired coverage area or near the edge of the desired coverage area from associating to this radio.

G. Per-Client Power Control

Similar to the beacon power parameter, the transmit power parameter can be controlled on a per-client basis. A transmit power generally refers to the Equivalent Isotropically Radiated Power (EIRP). The transmit power may refer to the amount of power that a theoretical isotropic antenna would emit to produce the peak power density observed in the direction of maximum antenna gain. The transmit power may be expressed in dB-microvolts (dBm) or in decibels above a reference level of one milliwatt (dBm). A wireless signal loses power as the wireless signal is transmitted from a first wireless device to a second wireless device. As a result of losing power, a wireless device receives a wireless signal at a particular signal strength that is lower than the transmit power with which the wireless signal was initially transmitted by another wireless device. Note that, the term "transmission power" and "EIRP" are used interchangeably in the present disclosure unless otherwise stated.

If a client device is well within the desired transmit coverage area and has enough SNR margin (e.g., has SNR of 55 dB, but the highest supported MCS requires only a maximum of 35 dB SNR), then the transmit power (or EIRP) for this client device can be reduced without any performance penalty. This has the desirable effect of minimizing interference from signals transmitted by other wireless network devices located in adjacent coverage areas. Note that, here, the transmit power is controlled not for the entire radio, but on a per-station basis. Thus, reducing the transmit power of an AP on a per-client basis effectively creates a different coverage area for each client device connected to the AP. While the client device is connected to the AP, the AP may want to guarantee that the client device receives its signals above the minimum signal strength value at the edge of the AP's transmit coverage area. Thus, in some cases, the AP may need to increase the transmit power to achieve this goal.

An Adaptive Radio Management (ARM) system can enforce channel selection and per-radio power control based on interference level calculations. However, conventionally, none of the above parameters are adjusted adaptively or configured in a coordinated manner.

Coordination of Control Parameters

According to embodiments of the present disclosure, an adaptive radio management system can first determine the best coverage areas for each access point, and then coordinate values of various control parameters to maintain consistent coverage areas. As such, the disclosed system is able to approximate the desired coverage area in a coordinated manner by modifying control parameters based on a determined cell size.

Control parameter management has the following goals: First, only client devices within the desired area are allowed to be associated with the AP; second, the AP shall trigger the roaming of a client device that is about to move out of the desired area to another AP; third, the AP shall minimize interference in the form of either co-channel interference (CCI) or adjacent-channel interference (ACI) from the AP's signals to network devices (e.g., other APs) or client devices located outside the AP's desired coverage area; fourth, the AP shall ignore interference and valid Wi-Fi transmissions from outside the desired coverage area; and last but not least, the AP shall adjust the transmit coverage area and the receive communication range so that they cover similar areas, when appropriate.

There are two steps in control parameter management. First, the disclosed system can determine the desired coverage area for each radio and adjust the coverage area as needed based on the changing radio frequency (RF) environment, network outage, AP density, client density, etc. Once the coverage area is determined, in the second step, the disclosed system coordinates other control parameters by adjusting values of the multiple parameters described above.

A. Determination of Desired Coverage Area

The coverage area can be determined from static configuration or dynamically by an adaptive radio management system. Note that, the terms "cell size," "coverage area," and "communication range" are used interchangeably throughout the present disclosure, and can be determined by any one or more of the factors such as signal strength, a signal-to-noise ratio, beacon modulation and coding set (MCS) rate, physical distance, and so on.

In some embodiments, the coverage area is determined based on a minimum signal strength value (e.g., a SNR value) that is preconfigured by a network administrator. For example, the network administrator may specify that an AP shall provide at least a minimum of 20 dB SNR anywhere within the cell. In order to provide a minimum of 20 dB SNR, the system will need to check for other factors, such as environmental factors, propagation attributes AP density, path loss, etc. For example, when the noise floor is at −90 dBm, to provide a minimum of 20 dB SNR, the system will need to ensure that each client device associated with the AP receives the AP's signal at −70 dBm or above.

In some embodiments, the coverage area may be determined by a minimum MCS value. For example, an AP may support a minimum MCS value of 6 anywhere within the boundaries of transmit coverage area. Based on the MCS value, the disclosed system can configure other control parameters to coordinate with coverage boundaries as determined by the MCS value.

In some embodiments, the coverage area may be determined by a physical distance value. For example, in an outdoor wireless network deployment, if the APs are deployed every 100 meters, then the coverage area for each AP can be configured as 100 meters in diameter.

B. Coordinating Control Parameters by De-Authentication

Subsequent to the determination of the desired coverage area, the per-radio de-sensing parameter value is configured based on the desired coverage area size. A de-authentication threshold is then calculated from the desired coverage area size. The client devices need to be de-authenticated before they move out of the boundaries of an AP's transmit coverage area. Once a client device moves out of the boundaries, the AP's radio will not be able to receive frames from the client device, but the client device may be able to receive frames from the AP. Therefore, the de-authentication threshold is calculated as the following:

$$DE\text{-}AUTH\ THRESHOLD = DESIRED\ CELL\text{-}SIZE - ROAM\_OFFSET\_1$$

where ROAM_OFFSET_1 is a positive number (less than DESIRED CELL-SIZE) that is selected based on the radio frequency (RF) environment. The de-authentication threshold calculated as such ensures that the AP will send the de-authentication frame before the client device moves out of the AP's transmit communication range. If the client device is active, the AP can determine whether the client device is about to move out of its transmit communication range based on the signal strength (e.g., RSSI or SNR) of frames received from the active client device. Otherwise, the AP may periodically poll (e.g., by sending NULL-DATA frames) the client device to determine whether the client device is about to move out of the AP's transmit communication range. For clients in the power save mode, the AP may periodically wake up the client device to determine its location relative to the AP's transmit communication range.

Additionally, for client devices that have not responded to a number of poll requests, the AP may initiate a one-sided DE-AUTH process. This is because the client device may be able to receive the DE-AUTH message from the AP, even though the AP is not able to carry on a mutual communication exchange with the client device. The AP may be configured with increase signal receiving sensitivity during polling and/or de-authentication process to widen its view of current locations of client devices and/or their positions within the AP's receive (Rx) communication range.

The standard IEEE 802.11 methods for triggering roaming can be implemented similar to the DE-AUTH method described above. Instead of sending a DE-AUTH message, the AP would be sending a basic service set (BSS) transition management message or a similar frame based on a ROAM_OFFSET_2 threshold.

In some embodiments, given a coverage area, an AP can determine whether a particular client device is located near the edge of the boundary based on the determined coverage. If the client device is detected to be near the boundary, the AP can de-authenticate the client device such that the client device will leave the AP's transmit coverage area after being de-authenticated.

In some embodiments, the network administrator may set a maximum transmit failure (i.e., max_Tx_failure) value. For example, the network administrator can specify the MAX_Tx_Failure value to be 25. Therefore, if the AP fails to receive an acknowledgement (ACK) frame after transmitting 25 consecutive frames to a particular client device, the AP will assume that the client device is not reachable. Note that, because it is possible that the de-sensing parameter may be set to a high threshold value such that the AP may not receive ACKs from the particular client device. Therefore, the maximum transmit failure value allows the AP to utilize various mechanisms (e.g., the de-authentication mechanism) to disconnect the particular client device.

C. Determining MCS Value

Moreover, the beacon modulation and coding set (MCS) value is also coordinated. Specifically, the system estimates the minimum SNR within the boundaries of a coverage area. If the coverage area is specified in terms of a SNR value, there is no estimation necessary. However, if the coverage area is specified in terms of a RSSI value, the minimum SNR can be calculated as:

$$\text{Minimum\_SNR} = \text{RSSI} - \text{Noise\_Floor}$$

where Noise_Floor generally refers to a measured or estimated value at the radio; and, RSSI generally refers to a received signal strength indicator in a wireless environment that indicates the power level being received by the antenna.

Once the minimum SNR is known, the maximum MCS value that still meet the beacon rate criteria (e.g., should be a basic rate, should be a legacy rate, etc.) can be selected based on known SNR requirements. FIGS. 3A-3B illustrate exemplary minimum Signal-to-Noise Ratio (SNR) requirements used by a parameter control scheme according to embodiments of the present disclosure.

Specifically, FIG. 3A includes at least the following fields: a number of streams 300, 20 MHz rate (Mbps) requirement 310, 40 MHz rate (Mbps) requirement 320, 40 MHz symbol guard interval (SGI) rate (Mbps) requirement 330, and minimum required SNR (dB) requirement 340. Here, guard intervals are used to ensure that distinct transmissions do not interfere with one another. The purpose of the guard interval is to introduce immunity to propagation delays, echoes and reflections, to which digital data is normally very sensitive. The standard symbol guard interval used in Wi-Fi can be 0.8 μs, 0.4 μs, etc. The shorter guard interval results in a higher packet error rate when the delay spread of the channel exceeds the guard interval. Based on FIG. 3A, the beacon rate for a particular wireless communication channel can be selected based on the minimum required SNR value. FIG. 3B includes another exemplary minimum Signal-to-Noise Ratio (SNR) requirements used by a cell size control scheme according to embodiments of the present disclosure. FIG. 3B includes at least a rate as measured in Mbps 350 and a minimum required SNR value as measured in dB 360. According to FIG. 3B, if the minimum required SNR value is 4, the AP's beacon rate would be selected as 1 Mbps. Likewise, if the minimum required SNR value is 8, the AP's beacon rate would be selected as 5.5 Mbps.

D. Per-Client Power Control

From the desired coverage area, the distance at which a certain minimum signal level must be maintained is known or can be calculated. For example, the desired cell size may translate to requiring the AP to maintain at least 75 dBm at 20 feet distance which approximates the coverage boundary.

Given this information, the beacon MCS value, and with the knowledge of propagation environmental path loss factor, the transmit power that should be used for beacon transmissions can be calculated. It is not required for client devices outside the coverage area to receive the beacons reliably.

The per-client power control, on the other hand, needs to make sure that the client device will have sufficient SNR for the specific MCS value being transmitted. If, based on the current EIRP of the radio, the AP-to-client has more than the required SNR for this MCS value, for example, based on ACK measurements, packet error and/or retry numbers, etc., then the power for this individual frame may be reduced to a value such that the SNR at the client device is:

$$\text{SNR}_{CLIENT} = \text{Minimum SNR required for MCS} + \text{Environment-Offset}.$$

The Environment-Offset generally refers to an offset included to account for any inaccuracies in measurements or differences in components or environment.

E. Determining Probe Request Threshold

The desired cell size, translated to SNR, also can be used to control the probe request threshold. Subject to certain conditions, the AP will not respond to client devices' probing messages transmitted from the edge of the desired cell size if there are alternative APs available to service such client devices. Note that, the APs typically will not receive probe request messages transmitted by client devices located outside the transmit coverage area, because de-sensing parameter (e.g., CSR indicating the wireless signal receive sensitivity) is set to not receive any frames outside the coverage area.

F. Communicating Cell Size Reduction Parameters to Client Device

An AP may communicate the cell size reduction parameters to a client device over the air using an IEEE 802.11 standard network protocol or a proprietary mechanism. The client device may use this information to implement the de-sensing mechanism such as CSR, to send probe request messages, to make roaming decisions, and/or to take any other actions related to cell size reduction.

Process for Adaptive Coverage Area Management

Figure 4:
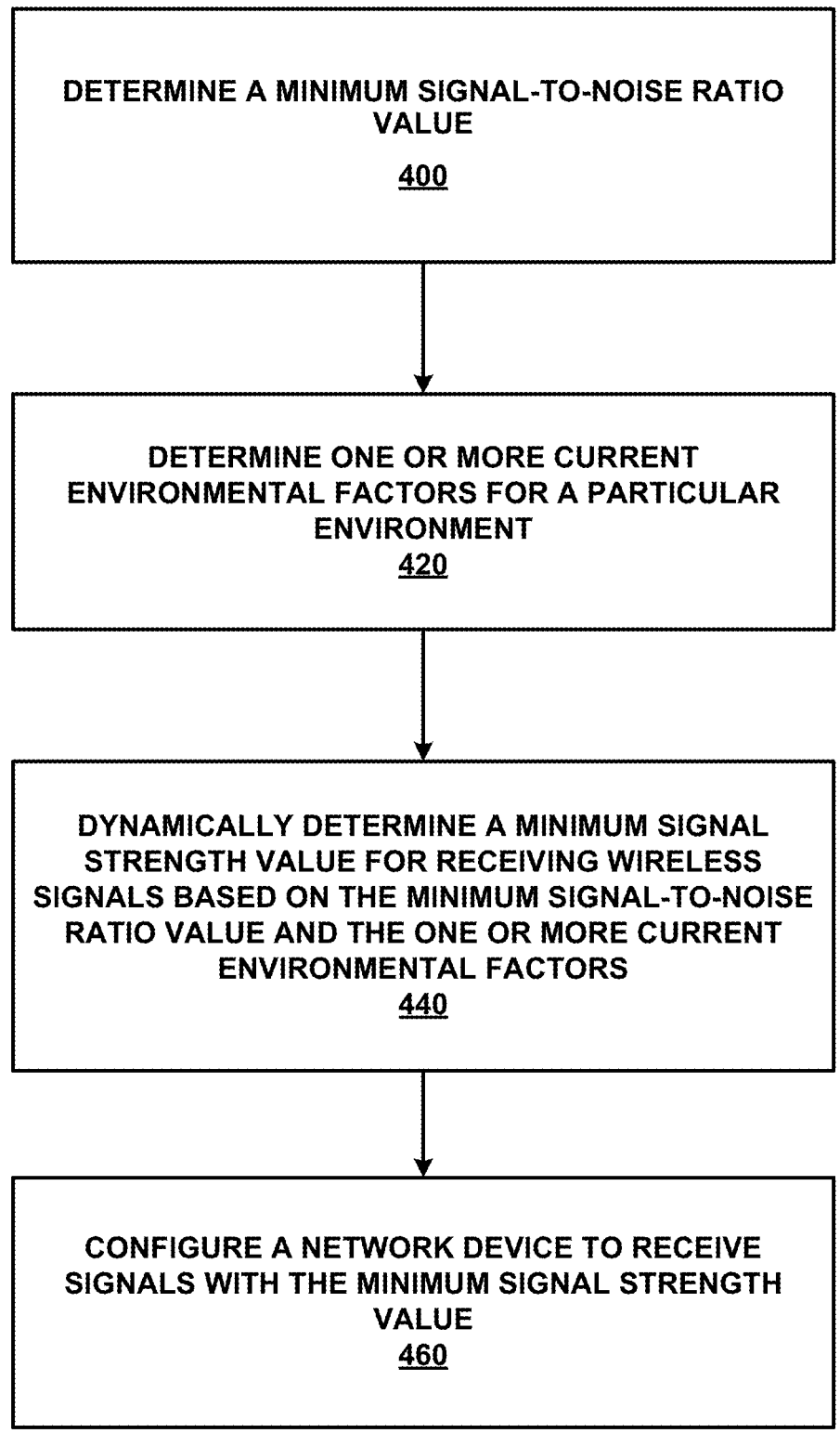
FIG. 4 illustrates an exemplary process for adaptive coverage area management according to embodiments of the present disclosure.

FIG. 4 illustrates an exemplary process for adaptive coverage area management according to embodiments of the present disclosure. Specifically, a disclosed network system can determine a minimum signal-to-noise ratio value (operation 400). The network system also determines one or more current environmental factors for a particular environment (operation 420). Further, the network system dynamically determines a minimum signal strength value for receiving wireless signals based on the minimum signal-to-noise ratio value and the one or more current environmental factors (operation 440). Moreover, the network system can configure a network device, such as an access point, to receive signals with the minimum signal strength value (operation 460).

In some embodiments, the one or more current environmental factors can include: a noise floor value, an access point density value, an environmental interference value, a channel utilization value, an environmental path loss value, etc.

In some embodiments, the network system determines the minimum signal strength value for receiving wireless signals by configuring a radio of an access point such that wireless signals with signal strength below the minimum signal strength are regarded as not received. In such cases, the radio will detect a wireless signal but will not trigger mechanisms, such as, CCA-CS, CCA-ED, etc., to receive the detected wireless signal.

In some embodiments, the network system determines a transmit power for transmitting wireless signals to a first client device based on the characteristics associated with the client device.

In some embodiments, the network system determines a transmission power for transmitting messages including (a) beacon frames or (b) multicast data such that the messages reach an approximate edge of a coverage area at a particular signal strength or a particular signal-to-noise ratio, the edge of the coverage area corresponding to a plurality of locations from which transmitted wireless signals reach the network device at approximately the minimum signal strength value.

FIG. 5 illustrates another exemplary process for adaptive cell size management according to embodiments of the present disclosure. Specifically, a disclosed network system estimates a particular coverage area such that a first set of wireless signals transmitted by devices located within the particular coverage area reach a network device at a minimum signal strength (operation 500). The network system then computes a transmission power to be used by the network device to transmit a second set of wireless signals such that the second set of wireless signals reach an edge of the particular coverage area at a particular signal strength value (operation 520). Moreover, the network system can configure the network device to use the transmission power to transmit the second set of signals (operation 540).

Figure 6:
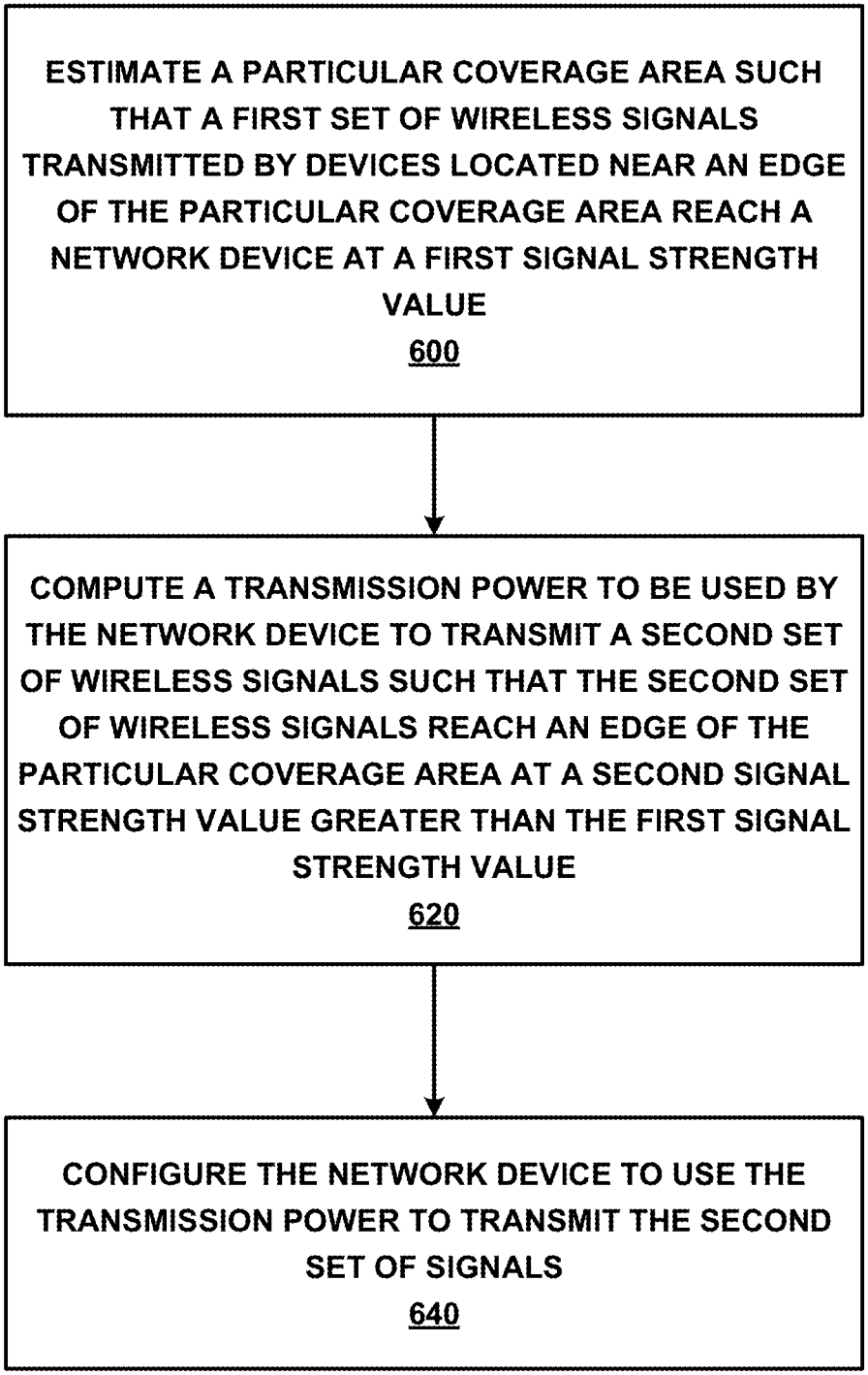
FIG. 6 illustrates an exemplary process for adaptive coverage area management according to embodiments of the present disclosure.

FIG. 6 illustrates another exemplary process for adaptive cell size management according to embodiments of the present disclosure. Specifically, a disclosed network system estimates a particular coverage area such that a first set of wireless signals transmitted by devices located near an edge of the particular coverage area reach a network device at a first signal strength value (operation 600). The network system then computes a transmission power to be used by the network device to transmit a second set of wireless signals such that the second set of wireless signals reach the edge of the particular coverage area at a second signal strength value greater than the first signal strength value (operation 620). Furthermore, the network system can configure the network device (such as an access point) to use the transmission power to transmit the second set of wireless signals (operation 640).

In some embodiments, the network system computes the transmission power using an estimated transmission power used by the devices to transmit the first set of wireless signals. Note that, in some embodiments, the particular signal strength value may be defined by an administrator. In some embodiments, the particular signal strength value is determined based at least on one or more of: a noise floor value, an access point density value, an environmental interference value, an environmental path loss value, etc.

In some embodiments, the network system also computes a transmission power to be used by the network device to transmit a set of wireless signals such that the set of wireless signals are received at a data rate based on a particular modulation and coding set (MCS) value used by the network device.

In some embodiments, responsive to determining that a client device is near the edge of the particular coverage area, the network system transmits a de-authentication message to the client device. In some embodiments, responsive to determining that a client device is near the edge of the particular coverage area, the network system refrains from responding to probe requests received by the network device from the client device.

In some embodiments, the network system computes the transmission power responsive to determining that a receiving device is located near the edge of the particular coverage area.

In some embodiments, the second set of wireless signals are unicast messages, and a third set of wireless signals comprising beacon frames and/or multicast messages are transmitted using a lower transmit power than the second set of wireless signals.

System for Adaptive Coverage Area Management

Figure 7:
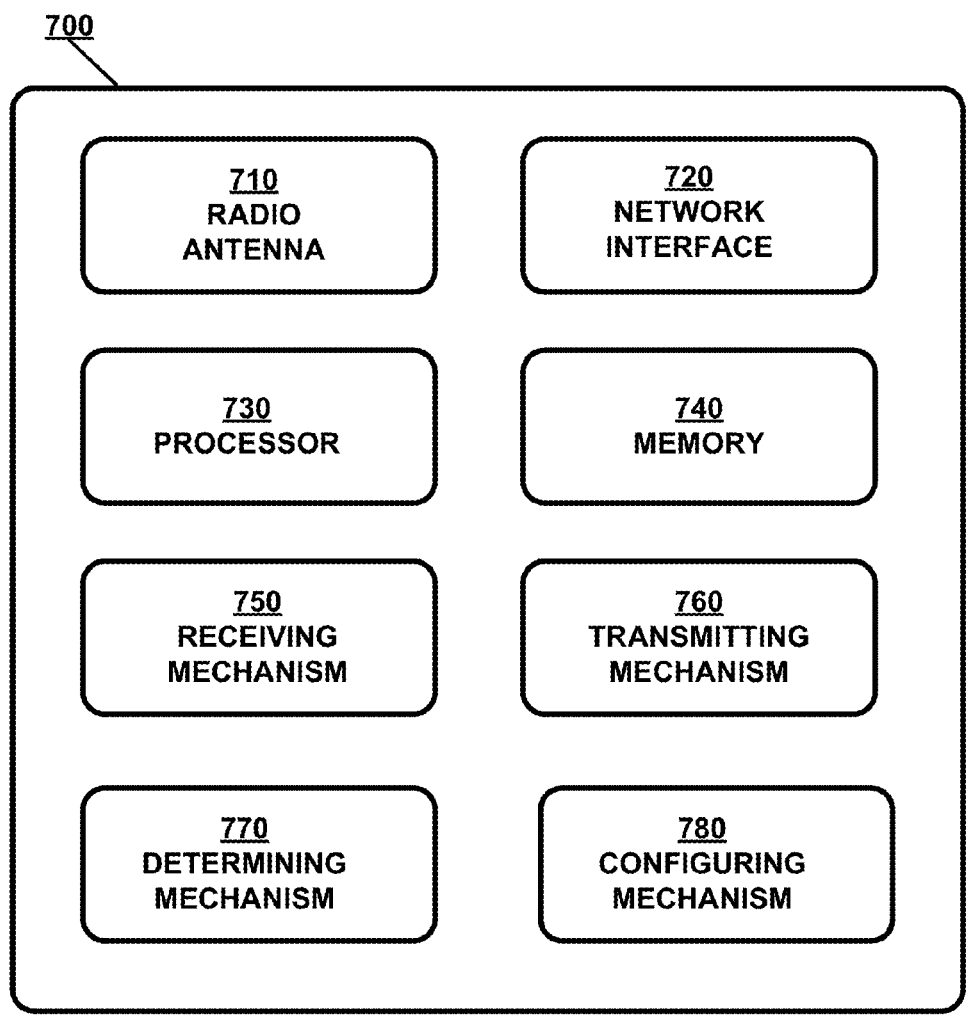
FIG. 7 illustrates an exemplary system for adaptive coverage area management according to embodiments of the present disclosure.

FIG. 7 illustrates an exemplary system for adaptive coverage area management according to embodiments of the present disclosure. Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, a determining mechanism 770, and a configuring mechanism 780, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on.

Transmitting mechanism 760 generally transmits messages, which include, but are not limited to, requests and/or responses, beacon frames, management frames, control path frames, and so on.

In some embodiments, responsive to determining mechanism 770 determines that a client device is near the edge of the particular coverage area, transmitting mechanism 760 transmits a de-authentication message to the client device. In some embodiments, responsive to determining mechanism 770 determines that a client device is near the edge of the particular coverage area, transmitting mechanism 760 refrains from responding to probe requests received by the network device from the client device.

Determining mechanism 770 generally determines a value associated with a signal and/or an environmental factor. Specifically, in some embodiments, determining mechanism 770 can determine a minimum signal-to-noise ratio value. The minimum signal strength value can be determined for receiving wireless signals by configuring a radio of an access point such that wireless signals with a signal strength below the minimum signal strength are regarded as not received.

In some embodiments, determining mechanism 770 determines one or more current environmental factors for a particular environment. The environmental factors may include, for example, a noise floor value, an access point density value, an environmental interference value, an environmental path loss value, etc.

In some embodiments, determining mechanism 770 dynamically determines a minimum signal strength value for receiving wireless signals based on the minimum signal-to-noise ratio value and the one or more current environmental factors.

In some embodiments, determining mechanism 770 determines a transmit power for transmitting wireless signals to a first client device based on the characteristics associated with the client device. Moreover, determining mechanism 770 can compute a transmission power to be used by the network device to transmit a set of wireless signals such that the set of wireless signals are received at a data rate based on a particular modulation and coding set (MCS) value.

In some embodiments, determining mechanism 770 determines a transmission power for transmitting messages comprising (a) beacon frames or (b) multicast data such that the messages reach an approximate edge of a coverage area at a particular signal strength or a particular signal-to-noise ratio, the edge of the coverage area corresponding to a plurality of locations from which transmitted wireless signals reach the network device at approximately the minimum signal strength value.

In some embodiments, determining mechanism 770 estimates a particular coverage area such that a first set of wireless signals transmitted by devices located within the particular coverage area reach a network device at a minimum signal strength. Further, determining mechanism 770 computes a transmission power to be used by the network device to transmit a second set of wireless signals such that the second set of wireless signals reach an edge of the particular coverage area at a particular signal strength value. Note that, determining mechanism 770 can estimate a transmission power used by the devices to transmit the first set of wireless signals. The particular signal strength value may be defined by an administrator. Also, the particular signal strength value can determined based at least on one or more of: a noise floor value, an access point density value, an environmental Interference value, an environmental path loss value.

In some embodiments, determining mechanism 770 estimates a particular coverage area such that a first set of wireless signals transmitted by devices located near an edge of the particular coverage area reach a network device at a first signal strength value. Further, determining mechanism 770 computes a transmission power to be used by the network device to transmit a second set of wireless signals such that the second set of wireless signals reach the edge of the particular coverage area at a second signal strength value greater than the first signal strength value. Note that, the second set of wireless signals comprise unicast messages, and wherein a third set of wireless signals comprising beacon frames and/or multicast messages are transmitted using a lower transmit power than the second set of wireless signals. Furthermore, determining mechanism can compute the transmission power is based on one or more of: a noise floor value, an access point density value, an environmental Interference value, an environmental path loss value. In some embodiments, determining mechanism 770 computes the transmission power in response to determining that a receiving device is located near the edge of the particular coverage area.

Configuring mechanism 780 generally configures a network device, such as an access point, to receive or transmit wireless signals. Specifically, configuring mechanism 780 can configure a network device to receive signals with the minimum signal strength value. In some embodiments, configuring mechanism 780 can configure the network device to use the transmission power to transmit the second set of signals. In some embodiments, configuring mechanism 780 can configure the network device to use the transmission power to transmit the second set of wireless signals.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a hardware processor, cause performance of operations comprising:
   estimating a particular coverage area using a modulation and coding set (MCS) rate such that a first set of wireless signals transmitted by devices located within the particular coverage area reach a network device at a minimum signal strength, wherein estimating the particular coverage area includes determining a threshold de-authentication distance from an edge of the particular coverage area;
   computing a transmission power to be used by the network device to transmit a second set of wireless signals such that the second set of wireless signals reach the edge of the particular coverage area at a particular signal strength value, wherein computing the transmission power includes modifying the MCS rate on a per-client basis;
   determining a location of the devices within the particular coverage area;
   configuring the network device to transmit the second set of signals using the transmission power; and
   transmitting a de-authentication message to a client device of the devices in response to a location of the client device being within the particular coverage area and within the threshold de-authentication distance from the edge of the particular coverage area.

2. The medium of claim 1, wherein the computing operation uses an estimates a transmission power used by the devices to transmit the first set of wireless signals.

3. The medium of claim 1, wherein the particular signal strength value is defined by a network administrator.

4. The medium of claim 1, wherein the particular signal strength value is determined based at least on a noise floor value.

5. The medium of claim 1, wherein the particular signal strength value is determined based at least on an access point density value.

6. The medium of claim 1, wherein the particular signal strength value is determined based at least on an environmental interference value.

7. The medium of claim 1, wherein the particular signal strength value is determined based at least on an environmental path loss value.

8. The medium of claim 1, wherein computing the transmission power comprises:
   computing the transmission power to be used by the network device to transmit the second set of wireless signals such that the second set of wireless signals are received at a data rate based on the modified MCS rate used by the network device.

9. The medium of claim 1, wherein the operations further comprise:
   responsive to determining that a client device is near the edge of the particular coverage area, refraining from responding to probe requests received by the network device from the client device.

10. A method, comprising:
    estimating, by a network device, a particular coverage area using a modulation and coding set (MCS) rate such that a first set of wireless signals transmitted by client devices located within the particular coverage area reach a network device at a minimum signal strength, wherein estimating the particular coverage area includes determining a threshold de-authentication distance from an edge of the particular coverage area;
    computing a transmission power to be used by the network device to transmit a second set of wireless signals such that the second set of wireless signals reach the edge of the particular coverage area at a particular signal strength value, wherein computing the transmission power includes modifying the MCS rate on a per-client basis;
    determining a location of the devices within the particular coverage area;
    configuring the network device to transmit the second set of signals to the client devices using the transmission power; and
    transmitting a de-authentication message to a client device of the devices in response to a location of the client device being within the particular coverage area and within the threshold de-authentication distance from the edge of the particular coverage area.

11. The method of claim 10, wherein the plurality of environmental factors comprise a noise floor value.

12. The method of claim 10, wherein the plurality of environmental factors comprise an access point density value.

13. The method of claim 10, wherein the plurality of environmental factors comprise an environmental interference value.

14. The method of claim 10, wherein the plurality of environmental factors comprise an environmental path loss value.

15. A non-transitory computer readable medium comprising instructions which, when executed by a hardware processor, cause performance of operations comprising:
 estimating a particular coverage area using a minimum signal-to-noise ratio value and a modulation and coding set (MCS) rate that is based on the minimum signal-to-noise ratio value such that a first set of wireless signals transmitted by devices located near an edge of the particular coverage area reach a network device at a preconfigured minimum signal strength value, wherein the minimum signal-to-noise ratio is determined based on a plurality of environmental factors for a particular network environment that includes the network device and the devices, and wherein estimating the particular coverage area includes determining a threshold de-authentication distance from the edge of the particular coverage area;
 computing a transmission power to be used by the network device to transmit a second set of wireless signals such that the second set of wireless signals reach the edge of the particular coverage area at a second signal strength value, wherein computing the transmission power includes modifying the MCS rate on a per-client basis;
 determining a location of the devices within the particular coverage area;
 configuring the network device to transmit the second set of wireless signals to the devices using the transmission power; and
 transmitting a de-authentication message to a client device of the devices in response to a location of the client device being within the particular coverage area and within the threshold de-authentication distance from the edge of the particular coverage area.

16. The medium of claim 15, wherein the second signal strength value is greater than the minimum signal strength value.

17. The medium of claim 15, wherein the plurality of environmental factors comprise a noise floor value.

18. The medium of claim 15, wherein the plurality of environmental factors comprise an access point density value.

19. The medium of claim 15, wherein the plurality of environmental factors comprise an environmental interference value.

20. The medium of claim 15, wherein the plurality of environmental factors comprise an environmental path loss value.

* * * * *